May 11, 1965   H. HURWITZ, JR   3,183,379
ELECTRIC GENERATION
Filed Oct. 6, 1960   2 Sheets-Sheet 1

Inventor:
Henry Hurwitz Jr.,
by John F. Ahern
His Attorney.

May 11, 1965  H. HURWITZ, JR  3,183,379
ELECTRIC GENERATION
Filed Oct. 6, 1960  2 Sheets-Sheet 2

Inventor:
Henry Hurwitz Jr.,
by John F. Ahern
His Attorney.

United States Patent Office 3,183,379
Patented May 11, 1965

3,183,379
ELECTRIC GENERATION
Henry Hurwitz, Jr., Schenectady, N.Y., assignor to General Electric Company, a corporation of New York
Filed Oct. 6, 1960, Ser. No. 60,996
9 Claims. (Cl. 310—11)

This invention pertains to an apparatus for generating electrical power, and more particularly, to an apparatus generating electrical power through the interaction of a moving conducting fluid and a magnetic field.

Present day methods for generating electrical power usually include a means for increasing the energy of a fluid, such as steam or combustion gases, and the subsequent conversion of this energy to electrical energy. This conversion requires an intermediate step, that is, the conversion of the fluid energy to mechanical energy before production of electrical power. This mechanical step in the production of electrical energy requires expensive equipment, such as turbines, and also reduces the efficiency of the conversion of heat to electrical energy. In an attempt to eliminate the conversion to mechanical energy, and thus make possible the direct conversion of heat energy to electrical energy, it has been proposed that heat energy be imparted to a conductive fluid which is then passed through a magnetic field. The electric currents generated in the fluid may then be removed for utilization in an electric load circuit. This type of electrical generation also has application to existing types of power generation to improve generating efficiency. The science dealing with interaction of a conducting fluid with a magnetic field is usually referred to as magnetohydrodynamics and is abbreviated MHD. Thus, direct conversion of heat to electrical energy is facilitated; however, the efficiency of this type of conversion, as well as certain practical limitations, have prevented the utilization of this type of direct conversion on a commercial basis.

In existing MHD electrical generator configurations, a partially ionized fluid is forced through a channel having a magnetic field which is transverse to the direction of fluid flow. The electric current which is generated by the interaction of the ionized gas with the magnetic field flows transverse to both the fluid flow direction and the magnetic field direction. In the application of Cobine and Harris, Serial No. 60,994, now Patent No. 3,149,247, granted September 15, 1964, and assigned to the assignee of the present invention, it was shown that through the use of the phenomenon known as the Hall effect, an axial current may be generated for utilization in an external load by providing a low resistance path for the transverse electric current. While the MHD generator configuration disclosed in the above-mentioned application provides vastly improved characteristics over prior generator configurations, the over-all operating efficiency may be improved still further while allowing MHD generation to be applicable under a greater variety of circumstances.

It is therefore an object of the invention to provide an MHD electrical power generator having improved operating characteristics.

It is a further object of the invention to provide an MHD generator having a higher efficiency than existing MHD generators.

It is still another object of the invention to provide an MHD generator having a configuration which greatly increases the flexibility of the generator and permits the use of MHD generation in a greater variety of applications.

Briefly stated, in accordance with one aspect of the invention, a magnetohydrodynamic generator is provided having a radial configuration wherein ionized fluids are admitted axially into the generator and are exhausted radially outward. Alternatively, the flow direction may be radially inward. A magnetic field is provided having lines of flux axially directed across the gap between two pole pieces of the generator. The radially flowing ionized fluid thus passes through a magnetic field having lines of flux transverse to the direction of flow; further, the radial configuration permits the utilization of the ionized fluid as a conductor to conduct the transverse electric currents generated by the interaction of the magnetic field with the ionized fluid. The interaction of this circulating current component with the magnetic field results in the creation of a radial current component which may be passed through a load to allow the extraction of power.

The invention both as to its organization and operation, together with further objects and advantages thereof, may best be understood by reference to the following description taken in connection with the accompanying drawings, in which.

Figure 1:
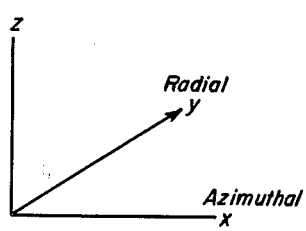
FIGS. 1 and 2 show coordinate systems which may be used for the explanation of phenomena occurring in the MHD generator configuration of the present invention.
Figure 2:
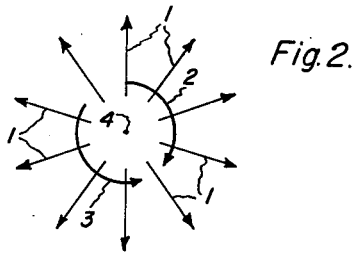

In order to facilitate the understanding of the present invention, reference will be had to the coordinate systems in FIGS. 1 and 2 of the drawings.

In FIG. 1, a standard three-dimensional coordinate system is shown. The coordinate system of FIG. 1 may be applied to the phenomena of magnetohydrodynamic generation. If an ionized fluid is caused tto flow in the direction of the $y$ axis, and a magnetic field is established having lines of flux along the $z$ axis, the interaction of the ionized gas with the lines of flux will establish an electric current component along the $x$ axis. If there is no electric field in the $x$ direction, the electric current in this direction can be large. The interaction of this transverse ($x$ direction) electric current with the magnetic field will cause a current in the direction of the fluid flow, that is, along the $y$ axis. The phenomenon which causes the generation of the $y$-component of electric current is one manifestation of the Hall effect. Briefly stated, the Hall effect is the phenomenon evidenced as a voltage developed at right angles to both a magnetic field and an electric current flowing through the magnetic field. Thus, utilizing the coordinates shown in FIG. 1 of the drawings, the spacial relationship of the ionized fluid flow, the magnetic field, and the current components may be visualized.

Proceeding to FIG. 2, the visualization of the interrelationship of the magnetic and electric effects may be applied to a radial configuration. In FIG. 2, the direction of ionized fluid flow is shown by the arrows 1. The direction of the lines of magnetic flux may be visualized as perpendicular to the plane of the paper; thus, the radially flowing ionized fluid passes through a magnetic field having lines of flux perpendicular to the direction of fluid flow. The interaction of the ionized fluid with the magnetic field establishes an azimuthal electric current which, according to the theory discussed in connection with FIG. 1, must be transverse to both the direction of fluid flow and the direction of the magnetic lines of flux. Therefore, the azimuthal electric current assumes a path indicated by the arrows 2 or 3. The azimuthal electric current may thereby be assumed to be in the plane of the paper and flowing clockwise or counterclockwise, depending on the polarity of the magnetic flux, about the axis 4 of the MHD generator configuration. Applying the principles of operation of MHD generation discussed in connection with FIG. 1 to the configuration demonstrated by FIG. 2, it may be seen that the azimuthal electric current flowing in the direction of arrows 2 or 3, which was generated by the interaction of the ionized fluid with the magnetic lines of flux, does not require an external means for completing the circuit to cause the azimuthal electric current to flow. This is a major advantage of the configuration of the present invention which is essentially a radial configuration Hall MHD generator.

Keeping in mind the analysis of the interrelation among the directions of fluid flow, magnetic flux, and generated electric currents discussed in connection with FIGS. 1 and 2, the description of the radial Hall-type MHD generator configuration of the present invention may now proceed in connection with FIGS. 3 and 4. A pair of axially displaced rings 10 of suitably excited magnetic material are positioned so as to form a radially extending duct 11 between their opposing faces 12. The openings 13 at the center of both of the rings 10 allow the admission of ionized fluid as indicated by the arrows 14. The ionized fluid flows axially into the openings 13 and thence radially outward through the channel 11. Electrodes 16 and 17 are mounted so as to be in contact with the ionized fluid as it enters the channel 11; electrodes 18 and 19 are mounted so as to be in contact with the ionized fluid as it exits from the channel 11. A plurality of windings 22 and 23 are provided for establishing a magnetic field having lines of flux perpendicular to the direction of fluid flow. A direction of the lines of flux is indicated by the arrows 25. It is apparent that this direction need not be constant, but may vary as a function of radius. An electric load 30 may be connected between electrodes 16 and 18 by conductors 31 and 32 respectively. Similarly, a load 33 may be connected between electrodes 17 and 19 by conductors 34 and 35 respectively. Alternatively, electrodes 16 and 17 on one hand, and electrodes 18 and 19 on the other hand may be interconnected and a single load used. The rings 10 are electrically insulated from the ionized gas passing through the channel 11 by a layer of insulating material 37.

Figure 3:
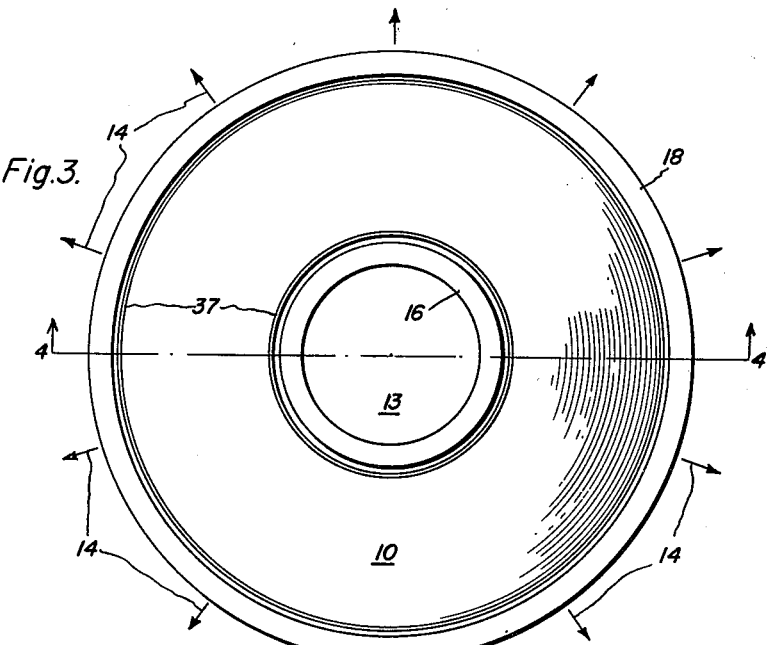
FIG. 3 is a horizontal elevation view of the radial MHD generator of the present invention.
Figure 4:
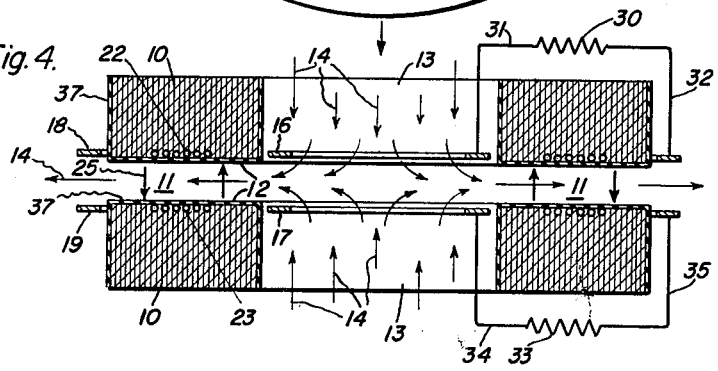
FIG. 4 is a sectional view of the generator of FIG. 3 taken along line 4—4.

The operation of the MHD generator configuration shown in FIGS. 3 and 4 may be described in terms of the physical phenomena and in terms of the geometric relationships between the direction of fluid flow and the direction of magnetic flux.

The ionized fluid is forced to flow radially outward or inward as indicated, for the former case, by the arrows 14. Since the magnetic field tends to constrain the motion of electrons, there will, in the former case, be a tendency for net positive charge to flow radially outward, unless there is a large electric field directed radially inward. If the electrical loads 30 and 33 are finite, net positive charge will, in fact, flow radially in the gas and be compensated by the emission of negative charge (electrons) from electrodes 18 and 19. At the same time, electrons will be flowing to electrodes 16 and 17 from the incoming fluid. Thus electrons flow radially outward in the external circuit, corresponding to a current flow inward from electrodes 18 and 19 to 16 and 17 in the external circuit.

From this explanation it may be seen that the generation of radial current and/or potential does not depend on the direction of the magnetic field but only on the direction of fluid flow, which may conveniently be radial inward or outward. The radial current will, however, interact with the magnetic field, producing a torsional force on the fluid which does depend on the direction of the magnetic field. It is, however, possible to eliminate the azimuthal motion produced in the fluid as it passes radially through the generator by causing the direction of the magnetic field to vary with radius in an appropriate manner. Alternatively, it may be convenient to introduce the fluid with a non-zero azimuthal component of velocity which may be removed from the fluid by virtue of the radial current component as the fluid passes through the generator. It is clear that by using techniques known to the art of gas dynamics and magnetohydrodynamics it is possible to design the field configuration to maximize the transfer of energy from the fluid to the external circuit.

The configuration of the MHD generator of FIGS. 3 and 4 permits the utilization of magnetohydrodynamic generation in situations that would preclude the practical utilization of prior art generators. For example, the ionized fluid source may be placed at the geometric center of the generator, and the MHD generator positioned about the source. This particular feature is very advantageous for certain types of ionized fluid sources such as a combustor or nuclear reactor. Thus, environmental geometric conditions as well as the considerations of gas dynamics may determine the parameters of operation, including, for example, whether fluid flow is radially inward or outward.

More than a single pair of rings may be utilized to advantage in certain circumstances. For example, several rings may be "stacked" in the axial direction to provide a plurality of radial channels and thereby increase the output power of the generator.

Figure 5:
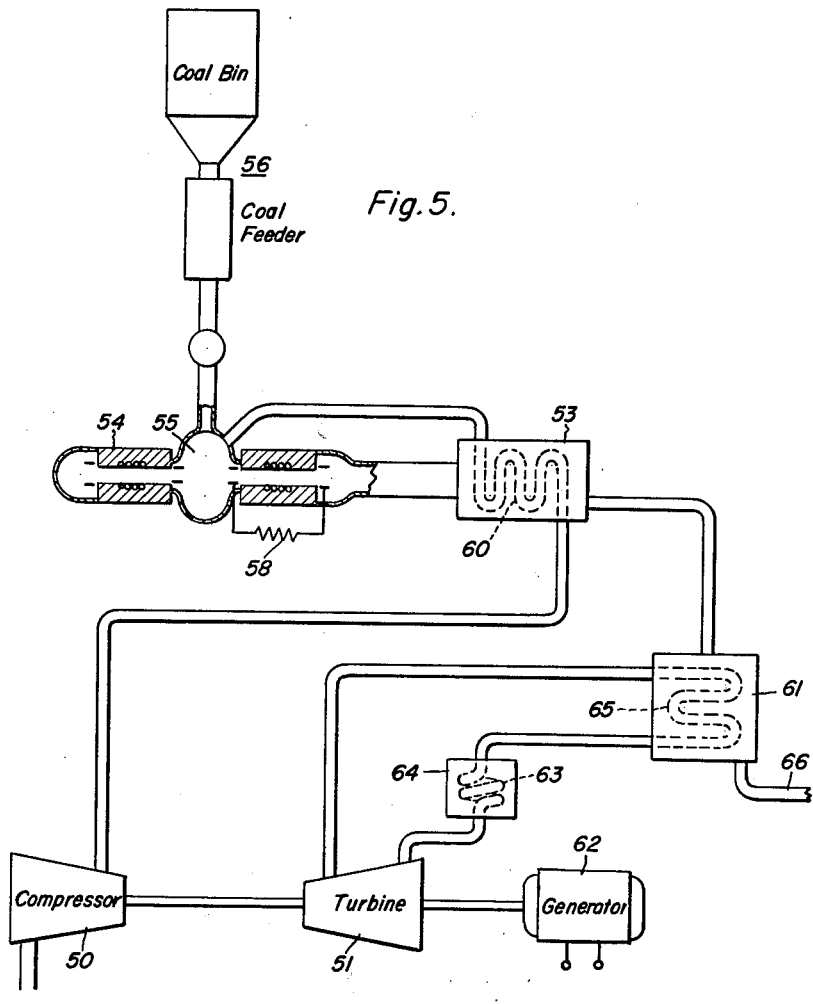
FIG. 5 is a schematic illustration of a complete power plant system utilizing an MHD generator constructed in accordance with the teachings of this invention.

FIG. 5 illustrates schematically an open cycle power plant incorporating and MHD generator. Incoming air passes through a compressor 50 which is driven by a prime mover such as a conventional steam turbine 51. Air from compressor 50, at 140 p.s.i. and 500° F., is further heated in regenerative heater 53 by the exhaust gases from an MHD generator illustrated at 54 and its temperature raised from 500° F. to approximately 3600° F. The preheated air, at 3600° F. and 140 p.s.i., flows into a combustion chamber 55 where pulverized coal from the bin and automatic feeder arrangement 56 is burned to raise the temperature of the gas to approximately 5000° F. After leaving combustion chamber 55, the ionization of the gas may be facilitated by any convenient method such as, for example, seeding the heated air stream with an alkaline metal. The conductive gas passes through an MHD generator shown at 54 and generates a voltage across the load 58 in the manner previously described. The extraction of energy from the gas in the form of electricity cools it and reduces its temperature to 4000° F. or so. This 4000° exhaust gas flows to regenerator chamber 53 and preheats the incoming gas passing through the heating coils 60. This reduces the temperature of the exhaust gas further and it exits from chamber 53 at approximately 2000° F.

The still hot gas then flows through a boiler 61 where the remaining thermal energy is abstracted to provide steam for the conventional steam turbine 51. Steam turbine 51, as explained previously, drives compressor 50 and also generates additional electrical power by driving a conventional generator 62. Exhaust steam from turbine 51 passes through suitable coils 63 of steam condenser 64. The condensate produced there flows through steam coils 65 in boiler 61 where the condensate is reconverted to steam by the 2000° F. exhaust gases passing through the boiler. The steam is then recirculated to drive turbine 51. In passing through the boiler 61, the exhaust is cooled from 2000° F. to approximately 300° F. and is exhausted to the atmosphere through a stack 66. It will be apparent that in an open cycle system such as that shown in FIG. 5, the efficiency of the cycle is greatly enhanced by combining the steam turbine 51 with the MHD generator since the energy in the heated exhaust gas from the generator is utilized to generate additional electrical power rather than being dissipated by exhausting to atmosphere at 2000° F.

It will be obvious to those skilled in the art that the MHD generator of the subject invention may be utilized in power plant cycles other than the open cycle system just described. Specifically, a closed cycle system may be utilized wherein a gas other than air is used as the working fluid and is continually recirculated. Such a closed cycle arrangement is particularly effective in connection with non-combusting heat sources of various sorts.

It will be obvious to those skilled in the art that many variations and modifications of the disclosed MHD generator configuration may be made without departing from the spirit and scope of the invention. Therefore, this invention is to be considered as limited only in accordance with the teachings thereof as set forth in the claims appended hereto.

What I claim as new and desire to secure by Letters Patent of the United States is:

1. A magnetohydrodynamic generator comprising, at least two rings displaced axially with respect to each other to form a channel between opposing surfaces thereof, means for establishing a magnetic field in said channel having lines of flux parallel to the axis of said rings, means for causing an ionized fluid to flow radially between said rings transverse to said lines of flux thereby creating a potential in said fluid in the direction of fluid flow, and means for electrically connecting said potential to a load.

2. A magnetohydrodynamic generator comprising, at least two rings displaced axially with respect to each other to form a channel between opposing surfaces thereof, means for establishing a magnetic field in said channel having lines of flux parallel to the axis of said rings, at least two electrodes in contact with said fluid displaced with respect to each other in the direction of fluid flow, and means for electrically connecting a load between said electrodes.

3. A magnetohydrodynamic generator comprising, at least two rings displaced axially with respect to each other to form a channel between opposing surfaces thereof, means for establishing a magnetic field in said channel having lines of flux parallel to the axis of said rings, means for causing an ionized fluid to flow radially between said rings transverse to said lines of flux thereby creating a potential in said fluid, between the fluid entering said channel and the fluid at the exit of said channel, a first electrode in contact with said fluid at the fluid entrance to said channel, a second electrode in contact with said fluid at the fluid exit to said channel, and means for electrically connecting a load between said electrodes.

4. A magnetohydrodynamic generator comprising, at least two rings of magnetic material displaced axially with respect to each other to form a channel between opposing surfaces thereof, said rings having a layer of insulating material on said opposing surfaces, means for establishing a magnetic field in said channel having lines of flux parallel to the axis of said rings, means for causing an ionized fluid to flow radially between said rings transverse to said lines of flux thereby creating a potential in said fluid in the direction of fluid flow, and means for electrically connecting said potential to a load.

5. A magnetohydrodynamic generator comprising, at least two rings of magnetic material displaced axially with respect to each other to form a channel between opposing surfaces thereof, said rings having a layer of insulating material on said opposing surfaces, means for establishing a magnetic field in said channel having lines of flux parallel to the axis of said rings, means for causing an ionized fluid to flow radially between said rings transverse to said lines of flux thereby creating a potential in said fluid in the direction of fluid flow, at least two electrodes in contact with said fluid displaced with respect to each other in the direction of fluid flow, and means for electrically connecting a load between said electrodes.

6. A magnetohydrodynamic generator comprising, at least two rings of magnetic material displaced axially with respect to each other to form a channel between opposing surfaces thereof, said rings having a layer of insulating material on said opposing surfaces, means for establishing a magnetic field in said channel having lines of flux parallel to the axis of said rings, means for causing an ionized fluid to flow radially between said rings transverse to said lines of flux thereby creating a potential in said fluid between the fluid entering said channel and the fluid at the exit of said channel, a first electrode in contact with said fluid at the fluid entrance to said channel, a second electrode in contact with the fluid at the exit of said channel, and means for electrically connecting a load between said electrodes.

7. A magnetohydrodynamic generator comprising, at least two rings of magnetic material displaced axially with respect to each other to form a channel between opposing surfaces thereof, said rings having a layer of insulating material in said opposing surfaces, means for establishing a magnetic field in said channel having lines of flux parallel to the axis of said rings, means for causing an ionized fluid to flow between said rings radially from the inner circumference to the outer circumference of said rings transverse to said lines of flux thereby creating a potential in said fluid in the direction of fluid flow, and means for electrically connecting said potential to a load.

8. A magnetohydrodynamic generator comprising, at least two rings of magnetic material displaced axially with respect to each other to form a channel between opposing surfaces thereof, said rings having a layer of insulating material on said opposing surfaces, means for establishing a magnetic field in said channel having lines of flux parallel to the axis of said rings, means for causing an ionized fluid to flow between said rings radially from the inner circumference to the outer circumference of said rings transverse to said lines of flux thereby creating a potential in said fluid in the direction of fluid flow, at least two electrodes in contact with said fluid displaced with respect to each other in the direction of fluid flow, and means for electrically connecting a load between said electrodes.

9. A magnetohydrodynamic generator comprising, at least two rings of magnetic material spaced axially with respect to each other to form a channel between opposing surfaces of said rings, said rings having a layer of insulating material on said opposing surfaces, means for establishing a magnetic field in said channel having lines of flux parallel to the axis of said rings, means for causing an ionized fluid to flow between said rings radially from the inner circumference to the outer circumference of said rings transverse to said lines of flux thereby creating a potential in said fluid in the direction of fluid flow, a first electrode positioned at the inner circumference of said rings and in contact with said fluid, a second electrode positioned at the outer circumference of said rings and in contact with said fluid, and means for electrically connecting a load between said electrodes.

References Cited by the Examiner

UNITED STATES PATENTS 1,443,091   1/23   Petersen.
2,652,778   9/53   Crever _____ 310—11 X MILTON O. HIRSHFIELD, *Primary Examiner.*

DAVID X. SLINEY, *Examiner.*